United States Patent [19]

Pai

[11] Patent Number: 5,516,338
[45] Date of Patent: May 14, 1996

[54] WATER-SOLUBLE TITANIUM SALT-TANNIN DYES AND METHODS OF USE THEREOF

[76] Inventor: Panemangalore S. Pai, 4100 Bridgewood La., Charlotte, N.C. 28226-7108

[21] Appl. No.: 377,954

[22] Filed: Jan. 25, 1995

[51] Int. Cl.$^6$ .............................. C09B 61/00; D06P 1/41
[52] U.S. Cl. ................ 8/596; 8/595; 8/645; 8/646; 8/626; 8/94.25; 8/657; 8/94.32; 8/653; 8/485
[58] Field of Search .................. 8/653, 594, 595, 8/596, 623, 626, 646, 645, 657, 94.25, 426, 94.32, 485

[56] References Cited

U.S. PATENT DOCUMENTS

| | | |
|---|---|---|
| 1,358,456 | 11/1920 | Miller ........................................... 8/646 |
| 1,980,429 | 11/1934 | Parkinson .................................... 8/646 |
| 2,068,877 | 1/1937 | Spence et al. ............................ 8/94.25 |
| 2,548,588 | 4/1951 | Carrara . |
| 4,318,818 | 3/1982 | Letton et al. . |
| 4,435,307 | 3/1984 | Barbesgaard et al. . |
| 4,555,348 | 12/1985 | Moran . |
| 4,740,213 | 4/1988 | Ricci . |
| 4,832,864 | 5/1989 | Olson . |
| 4,912,056 | 3/1990 | Olson . |
| 4,919,842 | 4/1990 | Dickson et al. . |
| 4,941,887 | 7/1990 | Sakagawa et al. . |
| 4,961,751 | 10/1990 | Eissele et al. . |

OTHER PUBLICATIONS

"Stone Finishing and dyeing of Cotton Garments", Textile Chemist, Feb. 1992, vol. 24, No. 2.

*Primary Examiner*—Margaret Einsmann
*Attorney, Agent, or Firm*—Weintraub, DuRoss and Brady

[57] ABSTRACT

An aqueous dye composition is based upon a mixture of a water-soluble titanium salt, preferably titanium potassium oxalate and a tannin substance, preferably Myrobalan extract. This dye composition may be used to dye either natural fibers, synthetic fibers or blends thereof. The composition is particularly advantageous for either bottom dyeing denim fabric which can then be overdyed with indigo blue dye to provide blue-green hues or as a mordant for a basic dye.

6 Claims, No Drawings

WATER-SOLUBLE TITANIUM SALT-TANNIN DYES AND METHODS OF USE THEREOF

BACKGROUND OF THE INVENTION

1. Field of the Invention

The present invention pertains to dyes and methods of use thereof. Even more particularly, the present invention pertains to means and methods for dyeing fabric. Even more particularly, the present invention pertains to water-soluble titanium salt-tannin dyes and the use thereof in dyeing fabric.

2. Prior Art

As is known to those skilled in the art, natural dyes provide hues and tones to textiles which are not attainable with synthetic dyes. Thus, where natural dyes, such as vegetables dyes, can be employed, it would be most advantageous for the garment manufacturer.

While vegetable dyes may take on the fiber without any other chemicals, it, like most dyes, usually requires another chemical or catalyst to join the chemical to the fiber. This catalyst is defined in the art as a "mordant". Mordants are applied across the spectrum of textile dyeing including natural fiber and synthetic fiber dyeing. Thus wool, cotton, silk, polyester, leather, etc. are all subject to a dyeing process which requires the use of mordants. Furthermore, mordants are employed whether using natural or synthetic dyes. A mordant may either brighten or dull the hue, depending on the selection thereof. Also, a mordant be may be either water-soluble or insoluble.

Typically, in dyeing natural fibers such as wool and cotton, the mordants which are employed are alum, chrome, and tin when seeking brightening mordants. For dulling, the mordants typically employed are copper and iron.

While all fibers and fabrics are subjected to dyeing processes, one of the fastest growing markets for dyed fabric and which has enjoyed continual growth over the last few years, is the denim fabric market. Denim blue jeans, jackets, etc. are an integral part of any wardrobe. Not only are there "worker" denim fabrics but "designer" fabrics and apparel as well. With this ever growing market, there is a need to produce such dyed fabric as quickly, economically and as efficiently as possible.

To accelerate the production of denim fabric, there has recently been developed the "quick wash" denim fabric which can be washed down to produce all of the various shade depths and appearances of denim currently in demand. Quick wash denim is described in the May, 1994 issue of *American Dye Stuff Reporter* at pages 15–16. Generally, denim being a cotton fabric it is difficult to dye with natural dyestuffs. Yet, and as is known to those skilled in the art to which the present invention pertains, indigo dye is employed to impart the blue hue to the denim fabric. Green hues may be obtained by dyeing the fabric in an indigo vat and then overdyeing with a yellow-producing dye. However, other colors are difficult to achieve.

Thus, it is to be appreciated that the use of naturally occurring dyes, other than indigo, to enhance the dyeing properties, such as laundry washed fastness and color tinctorial value would necessarily enhance denim jean marketability. Moreover, if such dyes could be applied to other fabrics using water-soluble mordants apparent advantages occur.

The use of tannins, which are vegetable dyes, as fabric or fiber dyes and as tanning agents for leathers is, of course, well known. Likewise, the use of tannins as mordants for other dyes has been known. Also, the use of other mordants to bind tannins is known. For example, the use of titanium potassium compounds as fixing agents for dyes has been known in the prior art. See, inter alia, U.S. Pat. No. 3,699,137. However, the use of water-soluble titanium salts in combination with tannin dyes as a mordant has not heretofore been known. In this regard, the use of basic colors or dyes on tannin-mordanted cotton is well documented. Typically, the cotton is mordanted with the tannin and either an antimony salt, e.g. tartar emetic, or an aluminum salt, e.g. aluminum potassium sulfate hydrate crystals. Moreover, the use of basic dyes after pre-treatment of the cotton with a stain resistant agent has been accomplished. The phenolic group of the stain resistant agent bonds to the cellulose of the cotton leaving the sulfonic group of the stain resistant agent free to bind the basic dye.

Similarly, basic dyes have been used to color not only cotton, but anionic fibers, wool and silk, as well as blends of cotton with synthetic fibers since basic dyes have a strong affinity for such. However, the use of water-soluble titanium based salts in combination with tannin dyes as mordants for basic dyes has not been taught heretofore.

It has been found that the use of titanium salts in combination with tannin substances enables the dyeing on both natural as well as synthetic fibers, as well as enabling overdyeing to provide deeper hues.

As will subsequently be detailed, the present invention provides water-soluble titanium salt-tannin dyes for use in both dyeing of textiles and as a mordant for natural and synthetic fibers. Such an aqueous dye is pre-eminently useful in accelerating and enhancing the dyeing of denim fabric as well as enabling the dyeing of cotton with basic colors.

SUMMARY OF THE INVENTION

In accordance with the present invention there is provided a water-soluble dye and method of dyeing a textile therewith. The composition hereof generally comprises:

(a) a water-soluble titanium salt;

(b) a tannin substance; and (c) water.

Among the useful water-soluble titanium salts are titanium potassium oxalate, titanium oxalate, titanium sulfate, titanium halides, such as titanium trichloride, titanium tribromide, titanium iodide, etc., titanium acetate, ferric titanate, and the like as well as mixtures thereof.

Useful tannin substances are those derived from the wood or bark from various trees such as chestnut, oak, hemlock, nut and the like. Among the useful tannins are, for example, Myrobalan extract, tannic acid, Divi Divi, Chinese galls, Cutch acacia, Logwood Haematine, quebracho, valonia, sumach, Gambier, Wattle extracts, larch bark, osage oranges, and the like.

The composition prepared therefrom is an aqueous solution having a pH ranging from about 2.5 to about 3.5.

The tannin substance is employed in the dye in an amount ranging from about 15 to about 30% by weight based upon the weight of the fabric to be dyed. The titanium salt is employed in an amount ranging from about 0.1% to about 10.0% by weight based upon the weight of the fabric to be dyed. Generally, there is a liquor to fabric weight ratio ranging from about 5 to about 30.

The composition is prepared by admixing the water-soluble salt and the tannin substance together in water at ambient conditions to form the liquor.

The tannin substance which is employed herein can be any of the tannin substances enumerated above, and preferably is Myrobalan extract. The titanium salt is preferably titanium potassium oxalate.

The titanium salt-Myrobalan extract mixture imparts a golden yellow hue to a textile treated therewith.

The composition is useful for the dyeing of wool, cotton, silk, synthetic fibers such as polyester and nylon, as well as mixtures of natural and synthetic fibers.

Moreover, the present composition is useful for both the bottom dyeing and overdyeing of denim fabric or yarn. Further, the present composition is useful as a mordant for basic dyes.

For a more complete understanding of the present invention, reference is made to the following detailed description and accompanying examples.

DESCRIPTION OF THE PREFERRED EMBODIMENTS

In accordance herewith and as above denoted, the present invention generally provides an aqueous dyeing composition which comprises: (a) a water-soluble titanium salt; (b) a tannin substance; and water.

The composition hereof is useful for dyeing both natural and synthetic fibers as well as blends thereof. Thus, the composition hereof can be used to dye wool, cotton, regenerated cellulose (rayon), silk, nylon, polyester as well as blends thereof.

Also, the present composition can be used as a mordant for a basic dye or color.

It should be noted that regardless of the tannin substance employed herein, the dye composition hereof can be applied either by the exhaust method or the pad dyeing method. Both the exhaust dyeing method and the pad dyeing method are well known to the skilled artisan.

Additionally, the composition hereof can be used for package dyeing, such as is used with yarn.

The titanium salt which is employed herein, as noted, must be water soluble, and capable of acting as a mordant to bind the dye to the fiber. Among the useful salts are titanium potassium oxalate, titanium oxalate, titanium sulfate, titanium halides, such as titanium trichloride, titanium tribromide, titanium iodide, etc., titanium acetate, ferric titanate, and the like as well as mixtures thereof.

The tannin substance which is employed is selected from among any of the well known compounds which are denoted as "tannins". The term "tannin" is a generic term for natural or vegetable occurring substances. Generally, tannins are characterized as being amorphous, astringent compounds which give colors with ferric salts. Chemically, all tannins contain polyhydroxyphenols or derivatives thereof.

The principal source of tannins is from the wood or bark of various trees from which they are extracted. They are found in chestnut wood, oak wood, quebracho, chestnut, oak bark, hemlock bark, gall nuts, etc. Amongst the useful tannin substances are Myrobalan extract, tannic acid, Divi Divi, Chinese galls, Wattle extracts, Cutch acacia, Logwood, haematine, quebracho, sumach, valonia, gambier, osage orange, larch bark, etc.

The appropriate tannin substance is selected depending upon the principal color which is desired. For example, Myrobalan extract gives a golden yellow shade for a base color, whereas Cutch acacia provides a reddish brown color and Logwood haematine provides a bluish-gray color.

Amongst the various tannin substances the preferred substance is Myrobalan extract. Myrobalan extract exhibits excellent properties for both bottom dyeing and overdyeing of denim fabric or yarn. Myrobalan extract provides a golden yellow shade which can be overdyed with synthetic or natural indigo color to give a greener indigo dye denim jean which can be further washed by the garment manufacturer to produce a "designer" bluish/greenish shade.

Myrobalan extract is a vegetable product found in gall nuts. It is an amorphous, yellowish powder which is water-soluble and which possesses a strong astringent taste and an acid character. Traditionally, it has been widely used by textile colorists since it acts the part of a mordant to produce an insoluble colored lake or pigment. Thus, Myrobalan can produce insoluble compounds with organic color bases. Myrobalan, when used conjointly with iron mordants, possesses a bluish-black color which is sufficiently intense to serve as a gray or even a black dye. Typically, the bluish-black color which it provides serves only to darken or intensify other colors.

Myrobalan is particularly advantageous for use in cotton dyes since it can be applied to the cotton by either exhaust or pad dyeing. In either method it is advantageously fixed on the fiber as an insoluble compound. Pad dyeing is generally carried out on a continuous rope-dyeing cotton warp yarn for denim. Mixed colors ranging from a green color to a black color can be produced by mixing the yellow dye and the indigo dye. Resulting dyed products are good in light fastness and also lend themselves to chlorine and enzymatic acid washes.

In preparing a composition hereof, the components are admixed with water at ambient conditions.

Generally, in a typical dyeing process a liquor to fabric weight ratio of about five to about thirty is employed. Ordinarily, one hundred pounds of textile are dyed in one thousand pounds of water, thereby representing a ten to one liquor ratio.

Generally, the tannin substance will be present in an amount ranging from about one to about thirty percent, by weight, based upon the weight of the textile to be dyed. Likewise, the water-soluble salt will be present in an amount ranging from about 0.1 to about 5% by weight, based upon the weight of the textile to be dyed.

Preferably, the dyeing composition will contain from about one to about thirty percent of the tannin substance and from about 0.1 to about ten percent by weight of the soluble salt, based upon the weight of the textile to be dyed.

In preparing the dyeing solution, the tannin substance and the water-soluble salt can either be added together or added in sequence, as desired, during the dyeing process.

Where the composition hereof is employed as a mordant for a basic dye, the textile is first mordanted with the composition hereof and thereafter dyed using the basic dye. Typically, basic dyeing is carried out at the boiling temperature of the dye for a period of about twenty to about sixty minutes, and preferably for about thirty to about forty-five minutes. Thereafter, the dyed garment is rinsed with hot water and soaped (both at about 140° F. to 160° F.) until clear. The mordanting of the fabric, which is usually cotton, can be achieved using either the pad method or the exhaust method.

For a more complete understanding of the present invention, reference is made to the following illustrative examples. In the examples, which are to be construed as illustrative rather than limitative of the present invention, all parts are by weight absent indications to the contrary.

EXAMPLE I

This example illustrates the efficacy of the dye of the present invention using the exhaust dyeing method.

Two batches of dyeing solution are prepared, one being a control batch and the other being in accordance herewith. The first batch contains 20 parts of Myrobalan extract powder, based upon one hundred parts of fabric within the bath, and water, with the liquor to fabric ratio being 10:1, by weight.

The fabric to be dyed is immersed in the liquor where it is raised to boiling temperature and maintained thereat for 30 minutes. Then, the fabric is rinsed hot at 140° F. for two minutes. The fabric is then soaked using a mixture of non-ionic detergent and soda ash, each being present in one part per liter of water. Soaping is maintained for two minutes. Thereafter, the fabric is again rinsed hot at 140° F. for two minutes. This is followed by a cold rinse and then air drying.

The process is then repeated, except that to the liquor is added three parts of titanium potassium oxalate. The dye bath has a pH of about 2.7 to 3.2.

The control and the inventive dye are tested out on swatches of fabric, for both home laundering and light fastness, in accordance with AATCC-3 and AATCC light fastness tests. The results of these tests are set forth in the following table:

TABLE 1

| Fabric Type | Test | Control | Inventive Dye |
|---|---|---|---|
| 100% cotton | AATCC-3[1] | 1.0 | 4.0 |
| | AATCC light fastness[1] | 1.0 | 3.5–4.0 |
| 50/50 polyester and cotton | same | 1.0 | 4.0 |
| | same | 1.0 | 3.5–4.0 |
| 85-15 cotton/nylon knitted blend | same | 1 | 4.0 |
| | same | 1.0 | 3.5–4.0 |

[1]American Association of Textile Chemists and Colorists Test Methods (1.0 = poor to 5.0 = best)

It can be seen from the above that with the various types of swatches the incorporation of the titanium potassium oxalate salt greatly increases both color retention after laundering as well as light fastness.

EXAMPLE 2

This example illustrates the dyeing of 100% cotton yarn in accordance with the present invention using the pad dyeing method.

Both a control bath and an inventive bath are used to pad dye 100% cotton yarn, in accordance with the following method:

To about 300 parts of water maintained at room temperature is added 11 parts of a 50% caustic soda solution containing 11 parts per liter concentration of the caustic soda.

To this aqueous alkali solution is added a 20% indigo liquid in a concentration of 30 parts per liter thereof. Thereafter, there is added to this solution an aqueous solution of Myrobalan extract neutralized to pH 7.0. The Myrobalan is present in a concentration of 15 parts thereof per liter of water. Thereafter, a six part per liter sodium hydrosulfite mixture is added to the bath. Then, the bath is diluted with water to one liter. The mixture then is allowed to stand for one hour to form a homogenous solution.

Next, a series of two by ten gram boiled cotton skeins are prepared by having the ends thereof taped and stapled together. All of the skeins are prewetted by immersion in an anionic wetting agent[1]. The anionic wetting agent is present in a concentration of three parts thereof per liter. After immersion the skeins are squeezed out with approximately 70–80% wet pickup.

[1] An anionic surfactant sold by BASF Corporation under the name PRIMASOL FP

Each skein is then passed through the dye bath six times, with one minute of air oxidation between passes, using approximately 90% wet pickup.

After the sixth pass, the skein is air oxidized for about five minutes. The skeins are rinsed under constant warm water maintained at about 120° F. for three minutes. Excess water is removed, the skeins are dried for 15–20 minutes at 180° F. and, thereafter, they are evaluated by visual observation.

It is visually observed from the above that the cotton skeins dyed with Myrobalan extract showed a distinct advantage of deeper and more intensive indigo ring dyeing, as opposed to indigo alone. While Myrobalan does not contribute to the change of color, the indigo blue becomes more intense and evidences about a two to three fold color enhancement.

EXAMPLE 3

This example illustrates the bottom dyeing of fabric using Myrobalan extract in accordance with the present invention prior to overdyeing the fabric with indigo using the pad dyeing method.

A mixture of 20 parts of Myrobalan extract and one part of titanium potassium oxalate are mixed together in water. This mixture is then applied to cotton skeins, as described in Example 2 above.

The skeins are squeezed to give an about 80% to about 100% wet pickup. The skeins are then dried at 120°–205° F. to a bone-dried condition.

The yellow-orange colored skeins are then overdyed by the pad dyeing method to produce a greener indigo shade on 100% cotton warp yarns.

This procedure is then repeated, except that the padded skeins are dried first and then steamed in a saturated steam nature for five minutes. The dyed skeins thus produced are then washed with a solution of 1.5 parts per liter of non-ionic detergent and one part per liter of soda ash at 140° F. for 2 to 4 minutes and dried again. Thereafter, the so-dyed skeins are overdyed with indigo blue.

These yarns can then be subsequently woven into denim fabrics and other garments which can be sold as greener indigo dyed shades or further laundry washed by enzymatic acid wash methods to produce yellow to blue mixture of designer shades.

In practicing the present invention it must be noted that the so-dyed fabric can be further treated such as by sand blasting with aluminum oxide, sand or other abrasive compound. This will produce an irregular blue colored denim fabric having a core-dyed Myrobalan-titanium potassium oxalate yellow tone showing underneath.

EXAMPLE 4

This example illustrates the dyeing of fabric to obtain naturally dyed earth tones on various fabrics.

To 100 parts of fabric maintained in 1000 parts of water is added 30 parts of Myrobalan extract powder. The solution was heated to about 185° F. The fabric is then tumbled in the solution for about 25 minutes. The excess dye is then drained at the end of the dyeing cycle. Next, the fabric is removed and placed in a commercial dryer and dried at 180° F. for about 40 minutes. This creates a random or irregular yellow dyed pattern. Next, the so-treated fabric is emplaced in an aqueous solution containing 10 parts by weight, based on fabric weight, of titanium potassium oxalate and 990 parts of water. Thereafter, the fabric is soaped and dried, as described in Example I. The so-treated fabric shows excellent wash fastness under home laundering conditions.

In practicing the present invention, it has been observed that the color value of an overdyed denim fabric using the ring dyeing method provides a color value which is twice the strength as that of an indigo application alone. Necessarily therefore, denim jeans can be produced more economically with less indigo dye in the dye bath without the need of a buffered pH. This makes it much more economical in the surface dyeing of the fabric.

Likewise, similar multi-tone effects can also be produced using sandblasting containing liquid bleaches such as potassium permanganate, chlorine, bromine or any other oxidizing agent. This will give a two or three tone effect between lighter and darker indigo shades with the bottom dye yellow shade hue being cast. Likewise, the bleaching effect can be produced using pumice stones which have been marinated in bleach solutions. The use of pumice stones is used to carry out "stone washing", which is well known to the skilled artisan.

EXAMPLE 5

This example illustrates the use of the present composition as a mordant for a basic dye.

Following the procedure of Example 1, a series of cotton swatches are mordanted with the Myrobalan extract—titanium potassium oxalate dye defined therein.

The so-dyed swatches are then immersed in a basic color or dye and boiled therein for about thirty minutes. Thereafter, the swatches are removed from the dye bath and rinsed at 160° F., and then soaped with a nonionic detergent at 160° F. until the rinse is clear. The swatches are then air dried.

Each basic dye bath is an aqueous bath comprised of one percent of the dye and one percent of glacial acetic acid, both percents being based on the weight of the swatch.

The following table sets forth the swatches and the basic dyes which are employed:

| Cellulosic Fiber Swatch | Dye |
|---|---|
| 1 | Basacryl Red GL Powder[1] |
| 2 | Basacryl Yellow X-RL Liquid[2] |
| 3 | Sevron Blue SGMF 200%[3] |
| 4 | Astrazon Brilliant Red 4G200[4] |
| 5 | Astrazon Brilliant Blue FZRL 200[5] |

[1]Commercially available from BASF Corp. and having a color index (C. I.) basic red 29
[2]Commercially available from BASF Corp. and having a C. I. yellow 79
[3]Commercially available from Crompton & Knowles, CI basic blue 3
[4]Commercially available from Miles, Inc., CI basic red 4
[5]Commercially available from Miles, Inc., CI basic blue 147

The swatches are then tested for wash fastness and light fastness using the methods as described in Table I above. Based upon an average of the swatches as compared to a control using a mordant of Myrobalan extract and tartar emetic, the following results were observed:

| Test | Rating | |
|---|---|---|
| | Control | Inventive Dye |
| Wash Fastness | 2.0 to 3.0 | 4.0 |
| Light Fastness | 1.0 to 2.0 | 3.0 |

Thus, the present dye, as a mordant for a basic dye, enhances wash fastness and light fastness over the prior art.

In practicing the present invention, depending on the selected tannin, the resulting color will be different. While the admixture of Myrobalan extract with titanium potassium oxalate provides a yellow hue, admixing tannic acid with titanium potassium oxalate provides a light to dark reddish-brown. Likewise, admixing Cutch acacia with titanium potassium oxalate provides a brick red shade. Logwood Haematine extract with titanium potassium oxalate provides a gray-black shade.

It should be further noted with respect hereto that the dye composition hereof can have further mordants added thereto. For example, iron salts such as ferrous sulfate, ferrous ammonium sulfate, ferric chloride, ferric sulfate, ferric ammonium sulfate, ferric ammonium oxalate, ferric acetate, ferric nitrate, ferric citrate, ferric ammonium celtate and the like as well as mixtures thereof can be admixed with the dye hereof. Likewise, aluminum salts such as aluminum sulfate, potassium aluminum sulfate, aluminum acetate and the like can be added to the liquor, either sequentially or in admixture. Generally, the dye composition will contain from about 1 to about 30% by weight, based upon the weight of the fabric to be dyed, of the adjuvant, if present. As noted, the salts being water-soluble are easily admixed with the other components. Typically, the liquor containing the adjuvants will be about 10 parts by weight thereof per part of fabric to be dyed.

Having thus described the invention, what is claimed is:

1. A dying composition for fabrics and textiles, comprising:
   (a) a water-soluble titanium potassium oxalate salt;
   (b) a tannin substance; and
   (c) water.

2. The composition of claim 1 which comprises:
   (a) from about 1 to about 30 parts by weight of tannin substance per 100 parts by weight of fabric to be dyed;
   (b) from about 0.1 to about 5.0 parts by weight of the water-soluble titanium salt per 100 parts by weight of fabric to be dyed; and
   (c) the balance being water, the aqueous dye composition being in a liquor to fabric to be dyed weight ratio of about 10 to 1.

3. The dye composition of claim 1 wherein the tannin substance is Myrobalan extract.

4. A method for dyeing a fabric comprising applying to the fabric the dye composition of claim 1.

5. A method for dyeing denim fabric comprising:
   (a) applying to the fabric the dye composition of claim 1, and thereafter
   (b) overdyeing the fabric with indigo blue.

6. A mordant for a basic dye, comprising: the composition of claim 1.

* * * * *